United States Patent Office.

JAMES A. MEANY, OF BROOKLYN, NEW YORK.

IMPROVEMENT IN BLEACHING STAINED COTTON.

Specification forming part of Letters Patent No. 53,646, dated April 3, 1866.

*To all whom it may concern:*

Be it known that I, JAMES A. MEANY, of Brooklyn, in the county of Kings and State of New York, have invented a new and useful Improvement in Process for Bleaching Stained Cotton; and I do hereby declare that the following is a full, clear, and exact description thereof, which will enable others skilled in the art to make and use the same.

My invention has for its object to furnish an improved process by which stained and soiled cotton may be cleaned and bleached without injuring the fiber of the cotton in any respect, and leaving it clean and white; and it consists of passing the cotton through a solution of soda-ash and a solution of chloride of lime, and then treating it with vinegar in the proportions and manner hereinafter more fully described.

I first prepare a solution of soda-ash dissolved in warm water, in the proportion of two ounces of soda-ash and one-half of a gallon of warm water to a pound of cotton for the whole amount of the cotton to be cleaned and bleached. In this solution I allow the cotton to remain about one hour. I then wring it out and thoroughly rinse it in clean and cold water, from which I wring it out as dry as possible. I then put it to steep for about two hours in a solution of chloride of lime dissolved in warm water in the proportions of two ounces of chloride of lime to one-half a gallon of water for each pound of cotton to be cleaned or bleached. From this solution I wring the cotton out as dry as possible, and again thoroughly rinse it in clean cold water containing vinegar in the proportion of one ounce of vinegar to a pound of cotton for the whole amount of cotton to be cleaned or bleached. I then wring it out as dry as possible and put it to bleach and dry in some place where it will be exposed to the action of the sun. In this process the soda softens the stains and prepares them to be acted upon by the chloride of lime, which removes the dirt and stains, the vinegar in the last rinsing-water neutralizing any of the chloride that might be remaining in the cotton.

What I claim as new, and desire to secure by Letters Patent, is—

The process of cleaning and bleaching stained cotton by passing it through solutions of soda-ash and of chloride of lime, and rinsing it after each operation in cold water and in vinegar and water in the proportions and manner substantially as herein described, and for the purposes set forth.

The above specification of my invention signed by me this 6th day of February, 1866.

JAMES A. MEANY.

Witnesses:
M. M. LIVINGSTON,
ALEX. F. ROBERTS.